United States Patent
Haubennestel et al.

(10) Patent No.: US 6,870,024 B2
(45) Date of Patent: Mar. 22, 2005

(54) POLYMERIC UREA-URETHANE RHEOLOGY CONTROL AGENTS AND A PROCESS FOR THEIR PREPARATION

(75) Inventors: Karlheinz Haubennestel, Wesel (DE); Stefan Moessmer, Mettmann (DE); Sascha Huebers, Wesel (DE); Baerbel Gertzen, Emmerich (DE); Holger Heilmann, Wesel (DE)

(73) Assignee: BYK-Chemie GmbH, Wessel (DE)

( * ) Notice: Subject to any disclaimer, the term of this patent is extended or adjusted under 35 U.S.C. 154(b) by 0 days.

(21) Appl. No.: 10/659,588

(22) Filed: Sep. 9, 2003

(65) Prior Publication Data

US 2004/0127674 A1 Jul. 1, 2004

(30) Foreign Application Priority Data

Sep. 9, 2002 (DE) .......................................... 102 41 853

(51) Int. Cl.[7] .............................................. C08G 18/32
(52) U.S. Cl. .............................. 528/49; 528/59; 528/75; 525/123; 525/126; 525/128; 525/453; 525/459
(58) Field of Search ............................. 528/49, 75, 59; 525/123, 126, 128, 453, 459

(56) References Cited

U.S. PATENT DOCUMENTS

| | | | |
|---|---|---|---|
| 4,882,408 A | 11/1989 | Blum | .......................... 528/49 |
| 6,420,466 B1 | 7/2002 | Haubennestel et al. | ..... 524/195 |

FOREIGN PATENT DOCUMENTS

| | | | | |
|---|---|---|---|---|
| EP | 0007594 | 2/1980 | ........... | C08G/18/08 |
| EP | 1188779 | 3/2002 | ........... | C08G/18/28 |
| GB | 1408165 | 10/1975 | ............ | C09D/3/72 |
| WO | WO 0049063 | 8/2000 | ............ | C08G/8/10 |

OTHER PUBLICATIONS

PCT Search Report, Jan. 13, 2004.

*Primary Examiner*—Rachel Gorr
(74) *Attorney, Agent, or Firm*—Schwegman, Lundberg, Woessner & Kluth, P.A.

(57) ABSTRACT

The invention relates to a polymeric urea-urethane obtainable by first reacting a diisocyanate with a polyol to form a doubly NCO-terminated urethane prepolymer. Further reaction is subsequently carried out with a mixture of a primary monoamine and a primary diamine. After the second reaction the polymeric urea-urethane present is substantially free of isocyanate and of the monoamine and diamine used. It can be used as an agent for controlling the rheology of liquid polymers or polymer solutions.

22 Claims, No Drawings

POLYMERIC UREA-URETHANE RHEOLOGY CONTROL AGENTS AND A PROCESS FOR THEIR PREPARATION

RELATED APPLICATIONS

This application is a continuation under 35 U.S.C. 111(a) of German Patent Application No.: 102 41 853.5 filed Sep. 9, 2002, which application is incorporated herein by reference.

The invention relates to polymeric urea-urethanes in aprotic polar solvents for use as rheology control agents for liquid polymers or solutions thereof which can be used as coating materials, casting compounds, molding compounds or adhesives in the widest sense. The invention further relates to the process for preparing these polymeric urea-urethanes.

In order to influence the rheology of liquid polymer systems use is made predominantly of organic modified bentonites, silicas, hydrogenated castor oil and polyamide waxes. A disadvantage of these substances is that they are usually dry solids which have to be incorporated into the liquid polymer system in a form in which they are compounded by means of solvents, with shearing forces, to form a semi-finished product or by means of careful temperature control. If these temperatures are not maintained, crystallites occur in the finished coating system and can lead to defects in the coating.

The general drawback of these rheological auxiliaries employed at present is that they lead to turbidities and haze in clear, transparent coatings. Additionally, the handling of dry pulverulent products, which give rise to dusts in processing, is undesirable from the standpoints of production engineering and occupational hygiene.

Other proposals for rheology control are described in EP-A-0 198 519, U.S. Pat. No. 4,311,622 and U.S. Pat. No. 4,677,028, where polyisocyanates or polyisocyanurates are reacted with monoamines or polyamines in the mandatory presence of a binder to form polyureas. This polyurea is precipitated in the form of very fine, microdisperse crystals and so forms a run-preventing binder which is then offered as a sag control agent (SCA), as it is called.

EP-A-0 435 428 describes binder systems with rheology control properties, in which polyisocyanates are reacted with polyamines and monoamines in the presence of a film-forming carboxyl-containing polymer. The carboxyl groups can then be reacted with alkali to form the corresponding salts.

U.S. Pat. No. 4,882,408 describes likewise viscosity-controlled polyurethane systems which are prepared by reacting monoamines and/or polyamines with monoisocyanates and/or polyisocyanates in the presence of 1-component polyurethane binder.

U.S. Pat. No. 4,383,068 and U.S. Pat. No. 3,893,956 describe processes in which polyisocyanate adducts of monoalcohols with diisocyanates and, where appropriate, diisocyanates are reacted with primary and, where appropriate, secondary polyamines in the mandatory presence of binders to form urea adducts, these binders then having a rheology control property.

U.S. Pat. No. 4,261,845 describes polyureas for the thickening of oils. This entails the reaction of alkoxylated monoamines with diisocyanates to form the corresponding diurea. In this way the oils are thickened to form high-viscosity fats.

EP-A-1 152 019 describes thixotroped one-component adhesives and sealants which are prepared by reacting the isocyanates with, preferably, butylamine in a reactive carrier material, preferably a polyol, to form urea.

In all of these embodiments diureas or polyureas are prepared in a binder or carrier medium. The rheology control agents cannot be prepared on their own, without these carrier media, and consequently are of only limited usefulness.

U.S. Pat. No. 4,522,986 describes urethane-urea compounds which are prepared by reacting an NCO-terminated urethane prepolymer with an ethanol amine so as to form hydroxyurea-terminated rheology control agents. These NCO-terminated urethane prepolymers are obtained by reacting a polyether polyol with a stoichiometric excess of an aliphatic, cyclic polyisocyanate. The urethane-urea compounds are either isolated by concentration, as wax-like substances, or are isolated by dilution with acetone, for example, and the insoluble diurea compounds are isolated as crystalline substances, removed by filtration and discarded, and the urethane-ureas which remain in solution are isolated by distillation of the solvent, as wax-like solids. A disadvantage associated with this process is that the stoichiometric excess of the diisocyanate is reacted with the alkanolamine but must then be removed and discarded, since these ureas are insoluble in polymer solutions and would cause disruptions.

U.S. Pat. No. 6,316,540 describes polyurethane thickeners for aqueous systems that are composed of a polymerization reaction product of polyetherpolyol and a diisocyanate or triisocyanate which are reacted with a linear difunctional polar end group capping component specifically in such a way that for each equivalent of isocyanate approximately twice the equivalent amount of difunctional end group capping component is used. This gives hydrophilic, end group-functionalized polyurethane thickeners having molecular weights of approximately 10 000–approximately 30 000 g/mol. A disadvantage associated with this process is the difficulty of controlling the reaction of diisocyanates and triisocyanates with polyols. This reaction is known to be accompanied readily by crosslinking reactions, which can only be prevented by very high levels of dilution in appropriate solvents. These solvents must then be distilled off again and replaced by suitable solvents, such as butylglycol and water.

In the American Patent U.S. Pat. No. 4,314,924 a process for preparing a thixotropic agent is described which displaces some of the aforementioned disadvantages in describing urea-urethanes which are prepared in aprotic solvents, in the presence of lithium salts, by reacting isocyanate adducts with polyamines. The products thus prepared, however, have significant drawbacks owing to the fact that the preparation process does not provide access to pure monoadducts but instead forms mixtures of monoadducts and diisocyanates which then with diamines lead to uncontrolled lengthening of the urea-urethane chain. Such products then tend to exhibit precipitation and are extremely difficult to maintain in solution.

U.S. Pat. No. 6,420,466 describes a process for preparing a thixotropic agent which removes the above-described drawbacks and leads to specific urea-urethanes which, in polar aprotic solvents, together with lithium salts, form clear, storage-stable solutions. The disadvantage of these products is that, because of the diurea-urethanes that are now deliberately prepared, only a few active urea groups can be incorporated into the molecule and, consequently, the efficiency of these urea-urethanes is limited. Furthermore, the subsequent removal of the stoichiometric excess of diisocyanate by vacuum distillation is a complex and expensive process. The aim of the present invention was to find rheology control agents which are simple to prepare and which do not have the disadvantages stated in the aforementioned patent texts.

Surprisingly it has been found that in the reaction of isocyanate-terminated urethane prepolymers with mixtures of monoamines and polyamines in defined proportions to one another it is possible to prepare excellent rheology control agents. The rheology control agents of the invention are polymeric urea-urethanes obtained by a first reaction of a diisocyanate with a polyol, in which the diisocyanate is used in excess to form a doubly NCO-terminated urethane prepolymer in addition to excess diisocyanate (isocyanate mixture), followed by a second reaction of the mixture of the doubly NCO-terminated urethane prepolymer and the excess diisocyanate on the one hand with a mixture of at least one primary monoamine and at least one primary diamine (amine mixture) on the other hand, in which, based on 100 equivalents of the mixture of primary monoamine and primary diamine, from 0.1 to 45 equivalents of the diamine are used, with the proviso that after the second reaction the polymeric urea-urethane present is substantially free of isocyanate and of the monoamine used and the diamine used; as diisocyanate, polyol, monoamine and diamine it is also possible to employ mixtures of diisocyanates, polyols, monoamines and diamines, respectively.

A particular polymeric urea-urethane if formed from a diisocyanate having the general formula (I)

OCN—R¹—NCO (I)

a polyol having the general formula (II)

HO—R²—OH (II)

a monoamine having the general formula (III)

R³—NH₂ (III)

and a diamine having the general formula (IV)

H₂N—R⁴—NH₂ (IV)

where R¹ is a linear or branched alkylene radical having 1 to 8 carbon atoms, a cycloaliphatic radical, an arylene radical or an aralkylene radical, the abovementioned radicals being substituted if desired by C1 to C4 alkyl groups;

R² is a polyester radical, polyether radical, mixed polyester-polyether radical, polycarbonate radical or polyolefin radical, some of the polyethers present in the abovementioned compounds being substituted if desired by styrene oxide;

R³ is a linear or branched alkyl radical having 2 to 8 carbon atoms, a cycloalkyl radical, an arylene radical or an aralkylene radical, the abovementioned radicals containing if desired one or more heteroatoms and/or being substituted if desired by C1 to C4 alkyl groups and/or alkoxy groups, or R³ is a radical of the type aryl-CO—NH—;

R⁴ is a linear or branched alkylene radical having 1 to 12 carbon atoms, a cycloaliphatic radical, a polyether radical, an arylene radical or an aralkylene radical, the abovementioned radicals being substituted if desired by C1 to C4 alkyl groups, or R⁴ is a radical of the type —NH—CO—R⁵—CO—NH—; and R⁵ is a linear alkylene radical having 1 to 8 carbon atoms, a single bond or an arylene radical.

The doubly NCO-terminated urethane prepolymer can be formed from from n molecules of diisocyanate and from n−1 molecules of the polyol wherein n is an integer from 2 to 6, i.e., from 2–6 diisocyanate molecules and from 1–5 polyol molecules. Preferably n is from 2 to 4.

The reaction of the mixture of the doubly NCO-terminated urethane prepolymer and excess diisocyanate with the mixture of the primary monoamine and primary diamine to form the polymeric urea-urethane can be conducted in a in a polar aprotic solvent.

In another embodiment the polymeric urea-urethane is prepared in the presence of a soluble lithium salt.

A specific polyol is a diol.

A specific number-average molecular weight for the diols is from about 100 to about 4000 g/mol.

Specific diols useful in practicing the inventnion are polyester diols, polyether diols, mixed polyester polyether diols, polycarbonate diols, polyolefin diols, polyoxyethylene-block-polyoxypropylene glycols, and derivatives thereof. In addition, the diols can include styrene oxide incorporated by copolymerization, or mixtures of these compounds.

A specific polymeric urea-urethane can have more than two equivalents of diisocyanate per polyol equivalent.

The doubly NCO-terminated urethane prepolymer and excess diisocyanate, can be isolated and metered into a solution of the mixture of primary monoamine and primary diamine in a polar aprotic solvent optionally in the presence of a lithium salt dissolved in a polar aprotic solvent. Here, the second reaction takes place in temporal separation, when the mixture of the first reaction is metered into the amine mixture.

A specific amount of diamine is from 0.1 to about 45 equivalents of diamine, based on 100 equivalents of the mixture of primary monoamine and primary diamine.

A more specific amount of diamine is from 1 to about 35 equivalents of diamine, based on 100 equivalents of the mixture of primary monoamine and primary diamine.

An even more specific amount of diamine is from about 3 to about 25, equivalents of diamine based on 100 equivalents of the mixture of primary monoamine and primary diamine.

The urea-urethane polymers of the invention are prepared preferably in polar aprotic solvents such as N-methylpyrrolidone, N-butylpyrrolidone, N-cyclohexylpyrrolidone, dimethyl sulphoxide, dimethylformamide or dimethylacetamide, for example, in the presence where appropriate of soluble lithium compounds, such as lithium chloride or lithium nitrate, for example. The results are substantially clear to slightly turbid, viscous solutions having solids contents between 10–70%, preferably 25–50%, or wax-like solidified solutions which can be returned to a liquid, ready-to-apply form by gentle heating to about 40–70° C.

Besides the polymeric urea-urethanes themselves the invention relates to the process for preparing the polymeric urea-urethanes of the invention. In accordance with the process of the invention in a first reaction a diisocyanate is reacted with a polyol, the diisocyanate being used in excess, so as to form a doubly NCO-terminated urethane prepolymer which is present in addition to excess diisocyanate and subsequently in a second reaction the mixture of the doubly NCO-terminated urethane prepolymer and the excess diisocyanate on the one hand is reacted with a mixture of a primary monoamine and a primary diamine on the other hand, with the use, based on 100 equivalents of the mixture of primary monoamine and primary diamine, of from 0.1 to 45 equivalents of the diamine, with the proviso that the polymeric urea-urethane present after the second reaction is substantially free of isocyanate and of the monoamine and diamine used; as diisocyanate, polyol, monoamine and diamine it is also possible to use mixtures of diisocyanates, polyols, monoamines and diamines respectively. Particular embodiments of the process are set out herein.

The urethane prepolymers are prepared by reacting polyols, such as polyalkylene polyols, polyalkenyl polyols, polyether polyols or polyester polyols, for example, or mixed polyester/polyether polyols having preferably 2 hydroxyl end groups, referred to below as diols, with a stoichiometric excess of diisocyanates to form NCO-terminated urethane prepolymers. The preparation of the NCO-terminated urethane prepolymers is prior art and is conducted in accordance with the techniques customary in the polyurethane industry. Isocyanate-terminated prepolymers are sold by BAYER AG, for example, under the designation Desmodur E 22 and by Huntsman Polyurethanes, for example, under the designation Suprasec 1412.

The functionality of the NCO-terminated urethane prepolymers is $\geq 2$, preferably between 2 and 3. Functionalities >2 come about as a result of the fact that, depending on the reaction conditions, the NCO-terminated urethane prepolymers may also include allophanate groups, which come about through the reaction of the urethane groups that are formed with the free NCO units that are present and so give rise to higher functionalities. In the course of subsequent reaction between diol/diisocyanate adduct and the amine mixture, these allophanate groups cleave back again into urethane and free isocyanate, which reacts with further amine to form ureas.

The stoichiometric excess of diisocyanate should be calculated such that for each available diol equivalent more than 2 equivalents of isocyanate are used in the reaction, preferably between 3 and 10 equivalents, more preferably between 5 and 7 equivalents. As the person skilled in the art is aware, depending on the stoichiometric excess of free diisocyanate, this reaction produces not only the adduct of 1 mol of diol and 2 mol of diisocyanate but also chain-extended homologues of higher molecular mass.

After the reaction the fraction of diisocyanate that is not reacted with the diol, in contradistinction to the teaching of American Patent U.S. Pat. No. 6,420,466, is not removed but instead is included in the reaction with the monoamine/diamine mixture in the polyurea formation process.

In the formation of polyurea from the mixture of diol/diisocyanate adduct and the monoamine/diamine mixture the procedure is such that, after complete reaction, there is no longer any free isocyanate, i.e., 1 equivalent of the amine mixture is used per equivalent of diol/diisocyanate adduct: based on 100 equivalents of amine mixture between 0.1 and 45 equivalents, preferably between 1 and 35 equivalents and very preferably between 3 and 25 equivalents of the diamine are used.

It is important that all available isocyanate groups have been reacted and that after the reaction NCO groups are no longer detectable. The amount of amines should likewise be such that no substantial excess of free amine is detectable in the reaction material after the reaction. Small amounts of triol components, such as may occur as impurities in the polyols, can be tolerated in this process. It is advantageous to remove any water present in the polyols prior to the reaction with the diisocyanate. The polymeric urea-urethanes of the invention can be prepared in a closed, heatable and coolable stirred vessel, charged preferably with the polar aprotic solvents together with the monoamines and diamines and, where appropriate, the lithium compounds. The lithium salts can also be added to the urea solution after the reaction. As soon as the lithium salts have dissolved the urethane prepolymer is introduced into the amine solution with stirring. The reaction is exothermic and can easily be controlled by cooling. The reaction can be conducted at room temperature or at elevated temperatures up to the boiling temperature of the solvent used, with preference being given to the employment of temperatures of between 40 and 80° C.

For the preparation of the polymeric urea-urethanes of the invention it is possible to use polyethers or polyester diols, such as polyalkylene oxides, for example, such as polyethylene glycols, polypropylene glycols, polybutylene glycols, polytetrahydrofurandiols, and also polymers of mixed alkylene oxides, such as polyoxyethylene-polyoxypropylene glycols, for example, in which the alkylene oxides may be present at random or in block form. Particularly suitable are polyether diols mixed with propylene oxide, since their propensity to crystallize is lower. The polyether diols can also be prepared by starting the alkoxylation from linear or cyclic diols, such as from 1,4-butanediol, 1,6-hexanediol, 1,10-decanediol, 1,2-pentanediol, 2,2-dimethyl-1,3-propanediol, 2,5-dimethyl-2,5-hexanediol, 2-butene-1,4-diol, 2-butyne-1,4-diol, cyclohexanedimethanol and bisphenol A, for example. In order to control the compatibility of the polymeric urea-urethanes in the polymers it is advantageous to polymerize small amounts of styrene oxide into the polyethers, either randomly or in blocks. Besides the polyether diols it is also possible to use polyester diols, which are prepared preferably by ring-opening polymerization of lactones, such as $\epsilon$-caprolactone and/or $\delta$-valerolactone, for example, but also by self-condensation of hydroxycarboxylic acids such as hydroxystearic acid or by condensation of dicarboxylic acids and diols. As the starting component for the ring-opening polyester formation it is possible to use the diols suitable for the alkoxylation, such as 1,4-butanediol, 1,6-hexanediol, etc., for example. An alternative possibility is to use mixed polyether/polyester diols, prepared for example by using polyoxyalkylene glycols as described above as starting components for the ring-opening polymerization with the lactones. It is equally possible to adopt the inverse procedure and to alkoxylate the polyester diols subsequently. In this case it is possible to use the known alkylene oxides, such as ethylene oxide, propylene oxide, butylene oxide and styrene oxide. Besides the abovementioned diols it is also possible to use polycarbonate diols which are based on 1,6-hexanediol or 1,4-cyclohexanedimethanol from UBE Industries, Ltd. under the names UH-CARB50, UH-CARB100, UH-CARB200, UH-CARB300 or, respectively UC-CARB100 (the numbers indicate one tenth of the approximate molecular weight). Polyols likewise suitable, for the purposes of the invention, are, for example, polybutadienediols or their hydrogenated derivatives, which are available from Nippon Soda Co., Ltd. under the name Nisso GI-1000, 2000 and 3000 (the numbers indicate the approximate molecular weight of the hydrogenated polybutadiene diols). Dihydroxy-functional copolymers of ethylene and butylene, which are available from Kraton polymers under the name Kraton Liquid L-2203, are likewise used. Further diols, additionally, include for example dihydroxy-functional polydialkylsiloxanes such as $\alpha,\omega$-bis(3-hydroxypropyl)polydimethylsiloxane, for example.

The molecular weights of the diols useful in practicing the invention are from about 100 to about 4,000 g/mol, preferably between 190 to about 2,000 g/mol, and very preferably between 500 to about 1,500 g/mol.

Diisocyanates suitable for the reaction of these above-described diols with diisocyanates are aliphatic, cycloaliphatic and aromatic diisocyanates, alone or in mixtures. In general these isocyanates have the formula

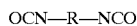

OCN—R—NCO where R can be arylene, alkylarylene and alkylene. Specific examples of such diisocyanates are 1,4-tetramethylene diisocyanate, 1,6-hexamethylene diisocyanate, 2,2(4),4-trimethyl-1,6-hexamethylene diisocyanate, 1,10-decamethylene diisocyanate, 1,4-cyclohexylene diisocyanate, p-phenylene diisocyanate, m-phenylene diisocyanate, 2,6-toluene diisocyanate, 2,4-toluene diisocyanate and their mixtures, p- and m-xylene diisocyanate, and 4,4'-diisocyanatodicyclohexylmethane. Preference is given to using 4,4'-diisocyanatodiphenylmethane, 3,3'-dimethyl-4, 4'-bis-phenylene diisocyanate, and 3,3'-dimethyldiisocyanatodiphenylmethane and very particular preference to using the isomer mixtures 2,4'- and 4,4'-diisocyanatodiphenylmethane, available for example as an isomer mixture in a ratio of 55+/−5% 2,4- and >38.5% 4,4-isomers e.g., Desmodur 2460 M from BAYER AG and as an isomer mixture in a ratio of 30% 2,4- and 70% 4,4-isomers, Suprasec×1004 from Huntsman. The advantage of these isomer mixtures is that these products are liquid and, accordingly, are easier to handle.

A large number of the above-described polyols and diisocyanates, and also the isocyanate-terminated adducts, are described in Kurt C. Frisch, *Fundamental Chemistry and Catalysis of Polyurethanes*, pages 3–10 and 12–18.

In the further reaction of the NCO terminated diols to the polymeric urea-urethanes of the invention use is made, as described above, of mixtures of primary monoamines and primary diamines. The monoamines are aliphatic, araliphatic and aromatic amines. For the aliphatic amines use is made of linear, branched or cyclic amines of chain length C2–C8, such as ethylamine, propylamine, isopropylamine, butylamine, sec- and tert-butylamine, 3-methyl-1-butanamine, hexylamine, 2-ethylhexylamine, octylamine, cyclopentylamine and cyclohexylamine, for example. The araliphatic amines are products such as, for example, benzylamine, 1- and 2-phenylethylamine, 4-methoxyphenylethylamine, β-(3,4-dimethoxyphenyl) ethylamine, 1-methyl-3-phenylpropylamine and furfurylamine. Phenylethylamine is preferred and benzylamine particularly preferred. The aromatic amines are essentially phenylamine, o-toluedine, 2,6-xylidine and benzoic hydrazide. The hydroxy-functional monoamines are excluded.

The diamines are aliphatic, araliphatic and aromatic primary diamines, such as hydrazine, for example, and its derivatives such as oxalic dihydrazide, succinic dihydrazide, adipic dihydrazide and terephthalic dihydrazide, for example, ethylenediamine, neopentanediamine, 1,2- and 1,3-propanediamine, 1,6-hexamethylenediamine, 1,8-octamethylenediamine, 1,12-dodecamethylenediamine, cyclohexyldiamine, 4,4'-diaminodicyclohexylmethane, 3,3'-dimethyl-4,4'-diaminodicyclohexylmethane, isophoronediamine, 4,7-diaxodecane-1,10-diamine, 4,7,10-trioxadecane-1,13-diamine, polyoxyalkylenediamines having a number-average molecular weight of between 148 and 400 g/mol, p- and m-xylenediamine, 4,4'-diaminodiphenylmethane and 3,3'-dimethyl-4,4'-diaminodiphenylmethane. m-Xylenediamine is preferred and p-xylenediamine is very particularly preferred. The monoamines can be used as mixtures, as can the diamines.

Furthermore, in addition to the monoamine/diamine mixture, it is also possible to use a proportion of water, since a diamine is formed as an intermediate from the corresponding diisocyanate and reacts with further isocyanate groups which are still present, to form the polyureas.

As lithium salts it is possible to use LiCl or $LiNO_3$, but preferably $LiNO_3$. The solids content of the urea-urethane solutions produced in this way is 5–80%, preferably 20–60%, more preferably 25–50%. The reaction of the NCO prepolymers with the monoamine/diamine mixture takes place in a polar aprotic solvent, such as dimethyl sulphoxide, N,N-dimethylformamide, N,N-dimethylacetamide, N-methylpyrrolidone, N-butylpyrrolidone or comparable alkylpyrrolidones, for example.

The fraction of lithium compounds is 0.2–2 mol, preferably 0.5–1.5 mol, and more preferably 0.6–1 mol, based on the amine equivalent of the monoamine/diamine mixture used.

The urea-urethanes prepared in this way contain neither free isocyanate nor free amine groups. Accordingly they are physiologically unobjectionable. Furthermore, no adverse side reactions with binders or fillers occur. The storage stability of these urea-urethane solutions prepared in this way is high and at normal storage temperature is easily 6 months or more.

The polymeric urea-urethanes of the invention find use as rheology control agents in liquid polymer systems. The inventive applications as rheology control agents include in particular the end uses specified in claims 17 and 18. These polymer systems may comprise solvents, which may also, however, be reactive and are also incorporated into the polymer system during the curing process of the polymer solutions.

By liquid polymer systems are meant formulations which in the uncured state are liquid or paste-like and which following application or other processing can be converted to a solid state by generally thermal processes but also by other mechanisms, such as free-radical copolymerization or polyaddition, for example. These are, for example, paints, nail varnishes, floor coating materials, molding compounds, laminating resins, adhesives, sealants, joint sealing compounds and filling compounds, PVC plastisols and printing inks.

All of these systems have the property of running on vertical surfaces, of penetrating deeply into fabric backings, for example, or, in the case of bonds, of not allowing dots of adhesive. Fillers and pigments, such as $CaCO_3$, $Al(OH)_3$, $Mg(OH)_2$, quartz flour, $Fe_2O_3$, $CrO_2$, $TiO_2$, mica, etc., for example, settle severely in liquid systems of this kind and are difficult to re-agitate. Lightweight fillers, such as hollow glass beads, for example, rise upwards and separate from the system. With all of these systems it is necessary to employ rheological agents in order to remove these disadvantages.

Paints and coating materials for the purposes of the invention are those, which are applied from liquid phase to a substrate and, with the formation of a film, form a protective or functional and/or decorative surface. By substrates are meant, for example, wood, metals, polymeric films, polymeric parts, paper, leather, fingernails and toenails, and construction materials, such as masonry, concrete and plasters, for example. The coating materials in question may be unpigmented, pigmented or dye-containing coating materials, which may in turn contain different kinds of binders, alone or in a mixture, such as, for example, unsaturated or saturated polyester resins, epoxy resins, polyurethane resins, acrylate and methacrylate resins, acrylate-amino resins, acrylate-isocyanate resins, nitrocellulose, cellulose acetobutyrate, alkyd-amino resins, alkyd resins, melamine resins, urea resins, silicone resins, and so on. As solvents these coating materials may comprise organic solvents and/or plasticizers, such as, for example, esters, ketones, aromatics, aliphatics and alcohols and/or water, as known to the person skilled in the art from the prior art. Adhesives are very often thixotroped with $SiO_2$. This serves for better rigidity on vertical surfaces, and also for preventing dripping. Examples of suitable binders for such adhesives include epoxy resins, polychloroprene resins, polyurethane resins (1-component and 2-component) and polyacrylate resins. In the field of sealants and joint sealing compounds it is common to use, for example, acrylic resins, butyl rubber, polysulphide rubber, epoxy resins and polyurethanes. With these systems as well highly disperse $SiO_2$ is used in order to achieve increased rigidity and thixotropy.

Plastisols consist essentially of pastable PVC powder or PVC copolymer powder and gelling plasticizers, such as dioctyl phthalate, diisodecyl phthalate, dioctyl adipate, dioctyl sebacate, butyl benzyl phthalate and tricresyl phosphate, for example. By means of $SiO_2$ a thixotropy is developed, the yield point is increased, and so running or sagging through a textile backing or other backing material, such as glass mat, for example, is prevented. Examples of fields of use include underbody protection of vehicles, sealants, synthetic leather, tarpaulins, floor coverings and dipping products.

Nail varnishes are derivatives of customary paints that are likewise of interest, and have the same problem of the settling of pigments, and must therefore be adjusted rheologically without affecting the flow when the varnish is applied to the nails.

In printing inks $SiO_2$ is again often used in order to raise the viscosity. This application is very similar to a conventional paint application as described above, particularly as regards pigmentation, the solvents and binders: here as well, for example, alcohols, esters, ketones, glycol ethers, water and hydrocarbons are among the solvents used. The binders are selected in accordance with the intended use of the printing ink: for example, modified rosins, resinates and hydrocarbon resins for gravure inks or polyvinyl resins, acrylic resins and polyamide resins for packaging inks.

By molding compounds are meant compositions which are processed to moldings, the reactive resins present in the compounds generally being reacted at an elevated temperature during the shaping operation. Molding compounds for the purposes of the invention are, for example, those based on unsaturated polyester resins and vinyl resins, by themselves or in combination with thermoplastics such as polystyrene, polyvinyl acetate, polymethyl methacrylate and styrene-butadiene copolymers, which are added to the polyester resins as shrinkage-reducing components. Further molding compounds are, in particular, polyurethanes, which are used, for example, in the process of reaction injection molding.

Other molding compositions can also be based on epoxy resins. These epoxy resins are preferably employed in the field of casting compounds and compression molding compounds. Further molding compounds, which can be processed for example by the wet compression process, injection process or pultrusion process, are the phenol-formaldehyde condensation resins, also known as phenolic resins.

The molding compounds in general may likewise include the additives or other constituents that are customary in the prior art. In particular, such molding compounds may include reinforcing and/or non-reinforcing fillers, such as glass fibers, carbon fibers and polyamide fibers, for example, wollastonites, silicates, inorganic carbonates, aluminum hydroxide, barium sulphate and kaolin.

Very particular preference is given in the context of the invention to the use of the compositions of the invention in laminating resins and gel coats (fine coats). Laminating resins are essentially systems conforming in principle to the remarks made in relation to molding compounds, but whose curing takes place in general at ambient temperature. Accordingly they are cold-curing systems, unlike the above-described molding compounds. Laminating resins are resins based for example on unsaturated polyester resins, vinyl resins and epoxy resins. These laminating resins are generally reinforced with glass fibers and carbon fibers and may include fillers such as $Al(OH)_3$, $CaCO_3$, $Sb_2O_3$ and other organic and inorganic pigments, besides other auxiliaries necessary for their processing, as is known to the person skilled in the art. The gel coats are subject essentially to the same remarks as made in relation to laminated resin, with key differences consisting in that the requirements imposed on the resistance properties of the gel coat resins are normally more stringent, particularly as regards water resistance and weathering stability. Furthermore, these gel coat resins may include color pigments, usually no reinforcing substances. These gel coat resins are generally thixotroped to a greater degree than laminating resins.

Thixotroping is particularly important in these systems: on the one hand since the aim is for effective penetration of the liquid resins into the layer structure of the reinforcing fibers and on the other hand because the aim is to prevent the resins running after a certain relaxation time. In the case of the gel coat construction effective leveling is needed despite the high proportions of $SiO_2$. This is achieved by a pronounced thixotropy, which is attained to a particular degree in accordance with the invention. Depending on the system in question it is possible to adjust the desired thixotropic effect in accordance with the application by means of the amounts of the polymeric urea-urethanes of the invention that are added: in other words, as the person skilled in the art is aware, different application methods such as laminating, injection or winding, for example, necessitate different rheological behavior.

In order to attain the desired thixotropic effect in the abovementioned systems it is preferred to add 0.1–5%, preferably 0.25–3%, very preferably 0.5–1.5%, based on the active substance of the polymeric urea-urethanes of the invention, to the liquid polymer systems.

The advantage of the rheology control agents of the invention is that they can be added without great technical effort to the liquid polymer systems with moderate stirring and do not require any mechanical dispersion processes, as is necessary in the case, for example, of $SiO_2$ or bentonites; moreover, they are liquids and not dust-forming powders. The polyurea solutions of the invention may also be added subsequently to the liquid polymer systems. The polyureas of the invention are, furthermore, fully reacted systems, which cannot undergo any further reaction with the binders, some of which are highly reactive. The formation in situ of the polyureas, as described for example in EP-A-0 198 519 by combining amine with isocyanate in the presence of the binder, is impossible in the case, for example, of unsaturated polyester resins or UV-curable acrylate coating materials, since the amines react spontaneously with binders.

Examples 1–24 below illustrate by way of example the preparation of the polyureas used in accordance with the invention.

Preparation of the NCO Prepolymers (Inventive)

EXAMPLE 1

1.2 mol of diphenylmethane diisocyanate (307.3 g) (Suprasec×1004 ex Huntsman polyurethanes; NCO content=32.8%, determined in accordance with DIN EN ISO 9369) are admixed dropwise under nitrogen blanketing at room temperature with 0.2 mol of hydrogenated 1,2-polybutadienediol (309.5 g) (OH number=72.5; OH number=mg KOH/g substance, determined in accordance with DIN/ISO 4629). During this addition the temperature is held constant. When addition is over the mixture is stirred until the theoretical NCO content of 13.6% is reached.

EXAMPLE 2

1.2 mol of diphenylmethane diisocyanate (305.5 g) (Desmodur 2460 M ex BAYER AG; NCO content=33%) are admixed dropwise under nitrogen blanketing at 40° C. with 0.2 mol of polybutadienediol (181 g) (OHN=124). During this addition the temperature is held constant. When addition is complete the mixture is stirred at T=40° C. until the theoretical NCO content of 17.3% is reached. Thereafter the batch is brought to room temperature.

Examples 3 to 6 are prepared in analogy to the process described in Example 1 and Example 7 is prepared by the process described in Example 2.

| Prepolymers | | | | |
|---|---|---|---|---|
| Example | Diol | NCO content [%] | Equivalent weight [g/eq] | Molar ratio NCO:OH |
| 1 | 1,2-Polybutadienediol hydrogenated (OHN = 72.5) | 13.6 | 308.8 | 6:1 |
| 2 | Polubutadienediol (OHN = 124) | 17.3 | 242.8 | 6:1 |
| 3 | Polyesterdiol (OHN = 107) | 16.2 | 259.2 | 6:1 |
| 4 | Tripropylene glycol (OHN = 584) | 22.8 | 184.2 | 5:1 |
| 5 | Polycaprolactonediol (OHN = 212) | 18.6 | 225.8 | 5:1 |
| 6 | Polypropylene glycol (OHN = 112) | 15.7 | 267.5 | 5.5:1 |
| 7 | PEO-b-PPO-b-PEO (OHN = 40) | 8.2 | 512.2 | 5:1 |

Preparation of Urea-urethanes (Inventive)

EXAMPLE 8

In 337 g of N-methylpyrrolidone at 60° C. 20.7 g of $LiNO_3$ and 49.4 g of the amine mixture (equivalent weight= 98.7 g/eq; 44.5 g of benzylamine and 4.9 g of 1,6-diaminohexane) are dissolved. Then at 80° C. 154.4 g of the NCO prepolymer prepared under Example 1 are metered in over the course of 1 hour. Following the addition the mixture is stirred for 1 hour and then cooled to room temperature. The resultant urea-urethane solution has a solids content of 40% by weight. A clear product which is stable over a relatively long time is obtained.

EXAMPLE 9

In 231.5 g of N,N-dimethylacetamide at 60° C. 14.8 g of LiCl and 53.2 g of the amine mixture (equivalent weight= 106.4 g/eq; 49.5 g of benzylamine and 3.7 g of 4,4'-diaminodiphenylmethane) are dissolved. Then at 60° C. 121.4 g of the NCO prepolymer prepared under Example 2 are metered in over the course of 45 minutes. Following the addition the mixture is stirred for 1½ hours and then cooled to room temperature. The resultant urea-urethane solution has a solids content of 45% by weight. A clear product which is stable over a relatively long time is obtained.

| | | | | Urea-urethanes | | | | | | | |
|---|---|---|---|---|---|---|---|---|---|---|---|
| Ex. No. | Prep. Ex. No. | Monoamine | Diamine | Equiv. monoamine [%] | Equiv. diamine [%] | Amine no.* mono-/diamine | Equiv. weight [g/eq] | Solvent | Lithium salt | Li content [mol]** | Temp. (NCO addition) | Solids [% by wt.] |
| 8 | 1 | Benzylamine | 1,6-Diaminohexane | 83.0 | 17.0 | 568.6 | 98.7 | NMP | $LiNO_3$ | 0.6 | 80 | 40 |
| 9 | 2 | Benzylamine | 4,4'-Diaminodiphenylmethane | 92.5 | 7.5 | 527.3 | 106.4 | DMAc | LiCl | 0.7 | 60 | 45 |
| 10 | 3 | Benzylamine | m-Xylylenediamine | 85.1 | 14.9 | 554.4 | 101.2 | DMF | $LiNO_3$ | 0.6 | 70 | 48 |
| 11 | 4 | Benzylamine | p-Xylylenediamine | 89.4 | 10.6 | 545.3 | 102.9 | DMSO | $LiNO_3$ | 0.8 | 40 | 35 |
| 12 | 5 | Benzylamine | Adipic dihydrazide | 88.0 | 12.0 | 536.4 | 104.6 | DMAc | LiCl | 0.9 | 50 | 45 |
| 13 | 6 | Benzylamine | p-Xylylenediamine | 95.4 | 4.6 | 533.3 | 105.2 | NMP | $LiNO_3$ | 0.8 | 80 | 40 |
| 14 | 6 | Benzylamine | m-Xylylenediamine | 78.3 | 21.7 | 569.4 | 98.5 | NMP | $LiNO_3$ | 0.75 | 80 | 40 |
| 15 | 6 | Benzylamine | 1,6-Diaminohexane | 79.9 | 20.1 | 577.5 | 97.2 | NMP | $LiNO_3$ | 0.6 | 60 | 45 |
| 16 | 6 | Benzylamine | 1,8-Diaminooctane | 85.8 | 14.2 | 549.8 | 102 | DMAc | $LiNO_3$ | 0.8 | 70 | 45 |

-continued

| Ex. No. | Prep. Ex. No. | Monoamine | Diamine | Equiv. mono-amine [%] | Equiv. di-amine [%] | Amine no.* mono-/diamine | Equiv. weight [g/eq] | Sol-vent | Lithium salt | Li content [mol]** | Temp. (NCO addi-tion) | Solids [% by wt.] |
|---|---|---|---|---|---|---|---|---|---|---|---|---|
| | | | | Urea-urethanes | | | | | | | | |
| 17 | 6 | Benzylamine | 4,4'-Diamino-diphenylmethane | 94.6 | 5.4 | 526.4 | 106.6 | DMF | $LiNO_3$ | 0.9 | 60 | 35 |
| 18 | 6 | Benzylamine | 1,12-Diamino-dodecane | 89.4 | 10.6 | 528 | 106.3 | NMP | LiCl | 0.75 | 80 | 40 |
| 19 | 6 | Benzylamine | Adipic dihydrazide | 85.6 | 14.4 | 538.8 | 104.1 | NMP | $LiNO_3$ | 0.8 | 50 | 30 |
| 20 | 6 | Benzylamine | Oxalic dihydrazide | 75.8 | 24.2 | 588.3 | 95.4 | NMP | LiCl | 0.8 | 50 | 35 |
| 21 | 6 | Furfurylamine | 1,6-Diamino-hexane | 84.3 | 15.7 | 617.2 | 90.9 | DMSO | $LiNO_3$ | 0.6 | 70 | 40 |
| 22 | 6 | 2-Ethyl-hexylamine | 1,6-Diamino-hexane | 80.2 | 19.8 | 488.1 | 114.9 | DMAc | $LiNO_3$ | 0.7 | 60 | 40 |
| 23 | 6 | 2-Phenyl-ethylamine | 1,6-Diamino-hexane | 81.1 | 18.9 | 514 | 109.1 | NMP | LiCl | 0.6 | 80 | 50 |
| 24 | 7 | Benzylamine | p-Xylylene-diamine | 86.5 | 13.5 | 551.4 | 101.7 | NMP | $LiNO_3$ | 0.8 | 50 | 45 |

*Amine number - mg KOH/g of substance, determined in accordance with DIN 16945
**Li content based on 1 equivalent of the amine mixture Performance Results Series 1: The urea-urethanes of the invention were investigated in the following systems for their ability to form gel structures.
1) Macrynal SM 510N: saturated polyester, 60% in xylene
2) Plasticizer: butyl benzyl phthalate, 100%

1%, based on the active substance, of an inventively prepared urea-urethane and of a comparative example from U.S. Pat. No. 6,420,466 is incorporated into the test systems by simple stirring with a spatula. Assessment is made visually after 24 hours.

TABLE 1

| Example | Gel strength in Macrynal SM 510N | Gel strength in butyl benzyl phthalate (BBP) |
|---|---|---|
| Comp. Ex. from US-A-6 420 466 | 2 | 6 |
| 8 | 1 | 5 |
| 9 | 2 | 5 |
| 10 | 1 | 5 |
| 11 | 1 | 3 |
| 12 | 1 | 5 |
| 13 | 1 | 1 |
| 14 | 1 | 1 |
| 15 | 1 | 4 |
| 16 | 1 | 1 |
| 17 | 1 | 1 |
| 18 | 1 | 1 |
| 19 | 1 | 2 |
| 20 | 1 | 4 |
| 21 | 1 | 3 |
| 22 | 1 | 5 |
| 23 | 1 | 2 |
| 24 | 1 | 2 |

1 solid structure
2 gel-like structure
3 strong structure
4 structure
5 little structure
6 no structure Series 2: The inventive urea-urethanes were investigated in unsaturated polyester resins for their no-sag and anti-separation properties. The UP resins used were as follows:

Palatal P4: industrially diluted (with styrene) to 58% solids and preaccelerated with 1% Co solution (DSM)
Palapreg P 18–03: solids=65%, 35% styrene (DSM)

1.5%, based on the active substance, of an inventively prepared urea-urethane and of a comparative example from U.S. Pat. No. 6,420,466 are incorporated with moderate stirring (Dispermat, 500 rpm, 0.75 m/sec) into Palatal P 4. After one hour the run test is carried out at 50–500 μm. For this test, the mixture has the curing agent (Butanox M 50) stirred into it and is then applied with a graduated doctor blade.

Evaluation: no-sag properties (layer thickness) in μm.

0.5%, based on the active substance, of an inventively prepared urea-urethane and of a comparative example from U.S. Pat. No. 6,420,466 is incorporated with moderate stirring (Dispermat, 500 rpm, 0.75 m/sec) into the test system (100 parts of Palapreg P 18–03; 20 parts of hollow glass beads of Scotchlite K 37 type). The samples are transferred to sealable glass cylinders (Ø=3 cm) and stored at 50° C. for five days.

Evaluation: Height of the liquid column (in cm) as a measure of the anti-separation properties:

0 cm: outstanding stabilization, homogeneous sample, no floating of the hollow glass beads 2 cm: stabilization inadequate, hollow glass beads float

TABLE 2

| Example | Gel strength in UP resin Palatal P 4 | No-sag properties in UP resin Palatal P 4 | Anti-separation properties in UP resin Palapreg P 18-03 |
|---|---|---|---|
| Comp. Ex. from US-A-6 420 466 | 1 | 125 μm | 2.0 cm |
| 8 | 1 | 150 μm | 1.2 cm |
| 10 | 1 | 200 μm | 1.8 cm |
| 11 | 1 | 175 μm | 0 cm |
| 13 | 1 | 250 μm | 0 cm |
| 14 | 1 | 200 μm | 0 cm |
| 15 | 1 | 250 μm | 0 cm |
| 16 | 1 | 200 μm | 0 cm |

TABLE 2-continued

| Example | Gel strength in UP resin Palatal P 4 | No-sag properties in UP resin Palatal P 4 | Anti-separation properties in UP resin Palapreg P 18-03 |
|---|---|---|---|
| 17 | 1 | 200 μm | 0.3 cm |
| 19 | 1 | 175 μm | 1.8 cm |

Series 3:

The objective was to eliminate the sedimentation of fillers in an epoxy resin compound for the electrical casting resin sector.

0.5%, based on the active substance, of an inventively prepared urea-urethane and of a comparative example from U.S. Pat. No. 6,420,466 are incorporated at 930 rpm (1.5 m/sec) on a dissolver for 1 min into an epoxy system (25 parts of epoxy resin Ruetapox VE 4518 K.A; 9 parts of o-cresyl glycidyl ether Ruetapox EPD KR; 44 parts of quartz flour W12 EST and 22 parts of aluminum hydroxide Martinal ON 310, all components ex Bakelite AG).

100 parts of this filled system are left to stand for 24 hours and then mixed with 20 parts of an epoxy resin hardener (Ruetapox VE 4518 K.B ex Bakelite AG) and 0.3 parts of benzyldimethylamine (Ruetapox BDMA ex Bakelite AG) in a dissolver at 930 rpm for 2 min. This mixture is dispensed into a PE beaker and cured at 95° C. for 2 hours. A disc 1 cm thick is cut from the top and bottom of the cured component. A portion of this specimen is ashed at 1000° C. for 2 hours, the filler content is determined, and hence the sedimentation is evaluated.

TABLE 3

| Additive | Resin/hardener mixture Filler content Curing 2 h at 95° C. | |
|---|---|---|
| | bottom | top |
| 0 sample | 55.70% | 42.90% |
| Comp. Example from US-A-6 420 466 | 51.20% | 45.80% |
| Ex. 14 (inventive) | 48.20% | 48.00% |

The data show that, even under intensified curing conditions, with the urea-urethane prepared in accordance with the invention the dispersion of the fillers is uniform, and hence no sedimentation is observable.

All publications, patents, and patent documents, cited in this application, are incorporated by reference herein, as though individually incorporated by reference. In the case of any inconsistencies, the present disclosure, including any definitions therein will prevail.

What is claimed is:

1. A polymeric urea-urethane prepared by a first reaction of a diisocyanate with a polyol;
   wherein excess diisocyanate is used to form an isocyanate mixture comprising a doubly NCO-terminated urethane prepolymer and excess diisocyanate; and
   followed by a second reaction of the isocyanate mixture with an amine mixture comprising at least one primary monoamine and at least one primary diamine;
   wherein the amount of diamine is from 0.1 to 45 equivalents, based on 100 equivalents of the mixture of primary monoamine and primary diamine;
   with the proviso that after the second reaction the polymeric urea-urethane present is substantially free of isocyanate and of the monoamine and the diamine,
   wherein the diisocyanate, polyol, monoamine and diamine can be single components or mixtures.

2. The polymeric urea-urethane according to claim 1, wherein the diisocyanate has the general formula (I)

$$OCN-R^1-NCO \qquad (I)$$

the polyol has the general formula (II)

$$HO-R^2-OH \qquad (II)$$

the monoamine has the general formula (III)

$$R^3-NH_2 \qquad (III)$$

and the diamine has the general formula (IV)

$$H_2N-R^4-NH_2 \qquad (IV)$$

wherein $R^1$ is a linear or branched alkylene radical having 1 to 8 carbon atoms, a cycloaliphatic radical, an arylene radical or an aralkylene radical; wherein the radicals can be optionally substituted by C1 to C4 alkyl groups;

$R^2$ is a polyester radical, polyether radical, mixed polyester-polyether radical, polycarbonate radical or polyolefin radical; wherein the polyethers can be optionally substituted by styrene oxide;

$R^3$ is a linear or branched alkyl radical having from 2 to 8 carbon atoms, a cycloalkyl radical, an arylene radical or an aralkylene radical; wherein the radicals can optionally have one or more heteroatoms; and optionally be substituted by C1 to C4 alkyl groups or C1 to C4 alkoxy groups, or $R^3$ is a radical of the type aryl-CO—NH—;

$R^4$ is a linear or branched alkylene radical having from 1 to 12 carbon atoms, a cycloaliphatic radical, a polyether radical, an arylene radical or an aralkylene radical; wherein the radicals can be optionally substituted by C1 to C4 alkyl groups, or $R^4$ is a radical of the type —NH—CO—$R^5$—CO—NH—; and $R^5$ is a linear alkylene radical having 1 to 8 carbon atoms, a single bond or an arylene radical.

3. The polymeric urea-urethane of claim 1, wherein the doubly NCO-terminated urethane prepolymer is formed from n molecules of the diisocyanate and n−1 molecules of the polyol wherein n is an integer from 2 to 6.

4. The polymeric urea-urethane of claim 3, wherein n is an integer from 2 to 4.

5. The polymeric urea-urethane of claim 1, wherein the reaction of the isocyanate mixture and the amine mixture is conducted in a polar aprotic solvent, optionally in the presence of a lithium salt.

6. The polymeric urea-urethane of claim 1, wherein the polyol is a diol.

7. The polymeric urea-urethane of claim 6, where the diol possesses a number-average molecular weight of from about 100 to about 4000 g/mol.

8. The polymeric urea-urethane of claim 7, where the diol is selected from compounds selected from the group consisting of polyester diols, polyether diols, mixed polyester polyether diols, polycarbonate diols, polyolefin diols, polyoxyethylene-block-polyoxypropylene glycols, and derivatives or mixtures of these compounds.

9. The polymeric urea-urethane of claim 8, wherein the diol includes styrene oxide, incorporated by copolymerization.

10. The polymeric urea-urethane of claim 1, wherein the having more than two equivalents of diisocyanate per polyol equivalent.

11. The polymeric urea-urethane of claim 1, wherein the isocyanate mixture is isolated before reaction with the amine mixture.

12. The polymeric urea-urethane of claim 1, wherein the amount of diamine is from 1 to about 35 equivalents of diamine, based on 100 equivalents of the mixture of primary monoamine and primary diamine.

13. The polymeric urea-urethane of claim 12, wherein the amount of diamine is from about 3 to about 25, equivalents of diamine based on 100 equivalents of the mixture of primary monoamine and primary diamine.

14. A process for preparing a polymeric urea-urethane of claim 1, comprising a first reaction a diisocyanate is reacted with a polyol, wherein the diisocyanate is used in excess, to form an isocyanate mixture comprising a doubly NCO-terminated urethane prepolymer and excess diisocyanate; and a second reaction of the isocyanate mixture and an amine mixture comprising at least one primary monoamine and at least one primary diamine;

wherein the amount of diamine is from 0.1 to 45 equivalents, based on 100 equivalents of the mixture of primary monoamine and primary diamine;

with the proviso that after the second reaction the polymeric urea-urethane present is substantially free of isocyanate and of the monoamine and the diamine, wherein the diisocyanate, polyol, monoamine and diamine can be single components or mixtures.

15. The process of claim 14, wherein the diisocyanate has the general formula (I)

$$OCN—R^1—NCO \quad (I)$$

the polyol has the general formula (II)

$$HO—R^2—OH \quad (II)$$

the monoamine has the general formula (III)

$$R^3—NH_2 \quad (III)$$

the diamine has the general formula (IV)

$$H_2N—R^4—NH_2 \quad (IV)$$

wherein $R^1$ is a linear or branched alkylene radical having 1 to 8 carbon atoms, a cycloaliphatic radical, an arylene radical or an aralkylene radical; wherein the radicals can be optionally substituted by C1 to C4 alkyl groups;

$R^2$ is a polyester radical, polyether radical, mixed polyester-polyether radical, polycarbonate radical or polyolefin radical; wherein the polyethers can be optionally substituted by styrene oxide;

$R^3$ is a linear or branched alkyl radical having from 2 to 8 carbon atoms, a cycloalkyl radical, an arylene radical or an aralkylene radical; wherein the radicals can optionally have one or more heteroatoms; and optionally be substituted by C1 to C4 alkyl groups or C1 to C4 alkoxy groups, or $R^3$ is a radical of the type aryl-CO—NH—;

$R^4$ is a linear or branched alkylene radical having from 1 to 12 carbon atoms, a cycloaliphatic radical, a polyether radical, an arylene radical or an aralkylene radical; wherein the radicals can be optionally substituted by C1 to C4 alkyl groups, or $R^4$ is a radical of the type —NH—CO—$R^5$—CO—NH—; and $R^5$ is a linear alkylene radical having 1 to 8 carbon atoms, a single bond or an arylene radical.

16. The process of claim 14, wherein the reaction of the isocyanate mixture and the amine mixture is conducted in a polar aprotic solvent, and optionally in the presence of a soluble lithium salt.

17. The process of claim 14, wherein the amount of diamine is from 1 to about 35 equivalents of diamine, based on 100 equivalents of the mixture of primary monoamine and primary diamine.

18. The process of claim 17, wherein the amount of diamine is from about 3 to about 25, equivalents of diamine based on 100 equivalents of the mixture of primary monoamine and primary diamine.

19. A liquid polymer system comprising a polyester resin, epoxy resin, polyurethane resin, acrylate resin, methacrylate resin, acrylate-amino resin, acrylate-isocyanate resin, nitrocellulose resin, cellulose acetobutyrate resin, alkyd-amino resin, alkyd resin, melamine resin, urea resin, silicone resin or mixtures thereof and the polymeric urea-urethanes of claim 1, as a rheology control agent.

20. The liquid polymer system of claim 19, further comprising solvents, wherein the solvents can optionally react with the polymer resin of the polymer system.

21. The liquid polymer system of claim 19, wherein the polymer system is a coating material, floor coating composition, adhesive, laminating resin, gel coat, PVC plastisol, molding compound, sealant, joint sealing compound, filling compound or printing ink.

22. The liquid polymer system of claim 19, further comprising fillers, pigments, or binders.

* * * * *